United States Patent
Bick et al.

(10) Patent No.: US 10,410,519 B2
(45) Date of Patent: *Sep. 10, 2019

(54) PUBLIC TRANSPORTATION NAVIGATOR

(71) Applicant: MOOVIT APP GLOBAL LTD., Ness Ziona (IL)

(72) Inventors: Roy Bick, Kfar Saba (IL); Nir Erez, Ness Ziona (IL); Yaron Evron, Ness Ziona (IL)

(73) Assignee: MOOVIT APP GLOBAL LTD, Ness Ziona (IL)

(*) Notice: Subject to any disclaimer, the term of this patent is extended or adjusted under 35 U.S.C. 154(b) by 0 days.

This patent is subject to a terminal disclaimer.

(21) Appl. No.: 15/786,618

(22) Filed: Oct. 18, 2017

(65) Prior Publication Data

US 2018/0040245 A1    Feb. 8, 2018

Related U.S. Application Data

(62) Division of application No. 14/425,637, filed as application No. PCT/IL2013/050756 on Sep. 8, 2013, now Pat. No. 9,799,222.

(Continued)

(51) Int. Cl.
| | |
|---|---|
| *G08G 1/13* | (2006.01) |
| *G08G 1/0968* | (2006.01) |
| *G08G 1/137* | (2006.01) |
| *G01C 21/34* | (2006.01) |
| *G06Q 10/02* | (2012.01) |
| *H04W 4/02* | (2018.01) |

(Continued)

(52) U.S. Cl.
CPC ............ *G08G 1/13* (2013.01); *G01C 21/3423* (2013.01); *G06Q 10/025* (2013.01); *G08G 1/096883* (2013.01); *G08G 1/137* (2013.01); *H04W 4/027* (2013.01); *H04W 4/046* (2013.01); *G07B 15/02* (2013.01); *G08G 1/012* (2013.01); *G08G 1/07* (2013.01); *G08G 1/096816* (2013.01); *G08G 1/096838* (2013.01)

(58) Field of Classification Search
CPC .. G01C 21/3423; G06Q 10/025; G07B 15/02; G08G 1/012; G08G 1/07; G08G 1/096816; G08G 1/096838; G08G 1/096883; G08G 1/13; G08G 1/137; H04W 4/02; H04W 4/027; H04W 4/046
See application file for complete search history.

(56) References Cited

U.S. PATENT DOCUMENTS

| | | | |
|---|---|---|---|
| 2008/0054072 A1* | 3/2008 | Katragadda | G08G 1/123 235/384 |
| 2008/0195428 A1* | 8/2008 | O'Sullivan | G06Q 10/00 705/6 |

(Continued)

*Primary Examiner* — Sisay Yacob
(74) *Attorney, Agent, or Firm* — A.C. Entis-IP Ltd.; Kenichi N. Hartman; Allan C. Entis

(57) ABSTRACT

A method for providing information relevant to using a public transportation system (PTS), the PTS comprising a plurality of PTS vehicles, the method comprising: receiving, at a server, data relevant to the PTS responsive to a first user of a PTS vehicle via a first user's communication device while the first user is using the PTS vehicle, the received relevant data comprising data descriptive of socially relevant features of users of the PTS vehicle; providing, on a second user's communication device, data responsive to the received relevant data.

14 Claims, 9 Drawing Sheets

Related U.S. Application Data

(60) Provisional application No. 61/697,822, filed on Sep. 7, 2012.

(51) Int. Cl.
  *G08G 1/07* (2006.01)
  *G07B 15/02* (2011.01)
  *G08G 1/01* (2006.01)
  *H04W 4/04* (2009.01)

(56) References Cited

U.S. PATENT DOCUMENTS

| | | | |
|---|---|---|---|
| 2009/0157613 A1* | 6/2009 | Strohmenger | G06Q 10/10 |
| 2010/0125410 A1* | 5/2010 | Hicks | B61L 25/025 |
| | | | 701/533 |
| 2012/0233246 A1* | 9/2012 | Guemez | G06Q 40/00 |
| | | | 709/203 |

* cited by examiner

PUBLIC TRANSPORTATION NAVIGATOR

RELATED APPLICATIONS

This application is a Divisional of co-pending U.S. application Ser. No. 14/425,637 filed on Mar. 4, 2015 and to be issued as U.S. Pat. No. 9,799,222 on Oct. 24, 2017, which was a US National Phase of PCT Application No. PCT/IL2013/050756, filed on Sep. 8, 2013, claiming the benefit under 35 U.S.C. § 119(e) of U.S. Provisional 61/697,822 filed on Sep. 7, 2012, the disclosures of which are incorporated herein by reference.

TECHNICAL FIELD

Embodiments relate to providing information relevant to using public transportation.

BACKGROUND

Various navigation systems for providing a user with geographic information are known in the art and are widely used in civil and military applications. In general, the information may be descriptive of natural and manmade physical parameters of a geographic area and may for example describe a configuration of roadways and venues accessed by the roadways in the geographic area and their respective statuses.

By way of example, a car may be equipped with a navigation system to determine a current geographic location of the car and/or to guide the car from an origin point to a destination point by providing its driver with appropriate instructions.

SUMMARY

Disclosed embodiments relate to providing a Public Transportation Navigator, hereinafter also referred to as "Tranzmate™" or "Tranzmate system" that is operative to provide a user (hereinafter also referred to as "Tranzmate-user" or "Tranzmator™") thereof with information (hereinafter also referred to as "PTS information") related to a public transportation system (PTS). PTS information may be provided substantially in real-time and may comprise data, "phy-data", that is descriptive of a physical state of the PTS and data, "psy-data", descriptive of socially relevant features of the PTS.

Phy-data may be descriptive of the infrastructure of the PTS such as, for example, the number of stops and stations along the routes and/or the types and conditions of vehicles that travel the routes. In addition, phy-data may be descriptive of the availability of services provided by the PTS such as, for example, timetable schedules; PTS vehicle travel patterns and delays; usage pattern of the PTS by passengers; the current location of PTS vehicles; PTS vehicle load and/or passenger load (e.g., passenger congestion, wait times at stops and stations). Phy-data may further comprise data about forecasts of the movement of crowds of people. Weather conditions, traffic congestions, maintenance operations, and accidents that affect operation of the PTS may also be considered phy-data.

Psy-data may be descriptive of PTS users and include, for example, data about gender, age, education, income, religious affiliation and/or interest profiles (e.g., romantic preference, preference on how to spend leisure time) of PTS users. Psy-data may also comprise personal identity data, for example names and images, that identifies specific PTS users.

PTS information may be provided to the Tranzmate-user in accordance with data ("preference-data") which indicate preferences of the Tranzmate-user. The preference-data may define constraints related to phy-data and/or psy-data and may be stipulated by a query of the Tranzmate-user. A query may, for example, define a desired trip using the PTS, trip travel times, a request to meet a particular friend on the trip, a request to avoid transit through a particularly dangerous neighborhood, and PTS vehicle appurtenances for the trip.

PTS information may be provided to the Tranzmate-user automatically as may be advantageous to the Tranzmate-user, for example in view of the Tranzmate-user's preferences with respect to the state of the PTS (e.g., PTS vehicle location) and/or the Tranzmate-user's behavior. For example, PTS information may include redirection instructions from a current route to an alternative route to spare the Tranzmate-user delays due to PTS vehicle delay on the current route caused by, e.g., traffic congestion, accidents and/or weather conditions or, for example, to correct a navigation mistake made by the Tranzmate-user.

PTS information may be provided to the Tranzmate-user via any of various ubiquitous mobile communication devices such as a portable multifunction device, a "Smartphone", a cellular communication device, a cellular phone, a tablet computer, a personal digital assistant (PDA) and/or a laptop computer. PTS information may also be provided via stationary communication devices such as a desktop computer and/or a computer terminal comprising, for example, a ticket vending machine.

Information comprising phy-data and/or psy-data may also be received at the Tranzmate system from PTS users and/or Tranzmate-users, via their communication devices, providing the information to the Tranzmate system actively and/or passively. For example, PTS users may actively provide the Tranzmate system with information comprising phy-data and/or psy-data in response to being prompted via their respective communication devices to do so while using the PTS. Additionally or alternatively, PTS users may passively provide phy-data and/or psy-data in response to unobtrusive monitoring, by the Tranzmate system, of the PTS users' behavior and/or identifying preferences of PTS users as evidenced from, and by use of, the PTS users' communication devices, while using the PTS. Phy-data and/or psy-data acquired from PTS and/or Tranzmate-users may be referred to as "crowd data".

Information comprising phy-data and/or psy-data describing the PTS may also be received at the Tranzmate system from databases.

Phy-data and/or psy-data may also be provided by computers and personnel that operate, monitor, and maintain the PTS, and may be referred to as "operator data".

Phy-data and/or psy-data that may generally be considered constant for relatively extended periods of time may be referred to as "static data". Static data may for example comprise data that characterizes features, such as by way of example, PTS vehicle routes and stations of the physical infrastructure of the PTS that change slowly. Phy-data and/or psy-data may be characterized as "statistical data" generated by analysis of many instances of data acquired for the PTS. Statistical data for example may comprise a median, an average and associated standard deviation for a number of PTS users using a particular route of the PTS, optionally as a function of time, such as time of day or day of the week. It is noted that any particular instance of data may be classified as belonging to more than one of the types of data noted above. For example, an instance of phy-data and psy-data that is statistical data may be generated responsive to statistical analysis of crowd data.

In some embodiments of the invention, the source for phy-data and/or psy-data (e.g., static data, operator data, statistical data and/or crowd data) may be selected according to a predetermined selection criterion. The predetermined selection criterion is responsive to the accuracy and/or availability of the data source at a particular decision instance. The predetermined selection criterion may for example be such that the data source provides the most accurate phy-data and/or psy-data in relation to the momentary behavior of the PTS.

In some embodiments of the invention, the Tranzmate-system may communicably interface with the operator of the PTS. Interfacing the Tranzmate-system with the operator of the PTS allows the Tranzmate-system to provide the operator with crowd data, which may otherwise not necessarily be available to the operator. The operator may use the crowd data for monitoring and controlling the PTS. The usage of crowd data instead of or in addition to static and/or operator data may facilitate control of the PTS to provide a higher quality-of-service.

In some embodiments of the invention, based on the tracking of current or estimation about future behavior of PTS users (e.g., by acquiring crowd data), reduced performance or capacity (hereinafter also referred to as "bottleneck") of PTS may be identified. Information comprising instructions which are indicative of how to reduce or eliminate bottlenecks may be provided, for example, to the Tranzmate-user(s) and/or the operator (e.g., operator personnel or automated control system) of the PTS.

In some embodiments of the invention, phy-data or psy-data may be fused to determine and bill a user for a particular trip on the PTS.

In some embodiments of the invention, the Tranzmate system may be operative to issue a redeemable certificate (hereinafter also referred to as "rider coupon") to the Tranzmate and/or the PTS user in exchange for their reporting about the physical and/or socially relevant features of the PTS. The rider coupon may for example grant a discount on a PTS fare, or provide a free coffee at a coffee bar accessible using the PTS.

In some embodiments of the invention, the Tranzmate-user may, while using the PTS, provide the Tranzmate system with psy-data that is indicative of the user's consumer preferences in relation to a given business or service provider. In response, the Tranzmate system may estimate the Tranzmate-user's time of arrival at the geographic location of the given business or service. The psy-data indicative of the Tranzmate-user's consumer preferences and time of arrival estimate may then be forwarded to the given business or service. This enables the given business or service provider to make advance preparations for serving the Tranzmate-user without any substantially delay. In some embodiments, the Tranzmate system is operative to provide a PTS traffic load map accessible by commercial enterprises to track crowd movement along the PTS.

There is therefore provided, in accordance with an embodiment of the invention, a method for providing information relevant to using a public transportation system (PTS). In embodiments, the method comprises receiving data relevant to the PTS responsive to a first user while the first user is using the PTS; and providing data relevant to the PTS to at least one of the first and a second user responsive to the received data.

In embodiments of the invention, the data relevant to the PTS responsive to the first user is received from the first user via a first communication device associated with the first user.

In embodiments of the invention, the data relevant to the PTS is provided via the first communication device associated with the first user and a second communication device associated with the second user.

In embodiments of the invention, the data relevant to the PTS is descriptive of at least one of physically relevant features and socially relevant features of the PTS. In embodiments, the data of socially relevant features is descriptive of at least one of the following: gender; age; profession; education; marital status; religious affiliation, indication about why the first user is using a particular route; interest profiles; and about the internet activity of the first user. In embodiments, the data of physically relevant features is descriptive of at least one of the following: the number of stops and stations along the routes, types and conditions of PTS vehicles that travel the routes, timetable schedules; position of PTS vehicles; PTS vehicle load; passenger load; delays, transit condition, line condition, estimate or forecast about passenger and vehicle movement, PTS vehicle travel patterns, and PTS usage patterns respective of PTS users.

In embodiments of the invention, the data is at least one of the following data type: operator data, crowd data, statistical data and static data.

In embodiments of the invention, the received data is indicative of the direction or the size of a crowd of people.

In embodiments of the invention, the step of receiving data relevant to the PTS responsive to the first user, while the first user is using the PTS, comprises: determining which data type to acquire according to a predetermined selection criterion; and acquiring the data-type relevant to the PTS in accordance with the predetermined selection criterion.

In embodiments, the method comprises analyzing the data relevant to the PTS and responsive to the received data such to provide PTS information to at least one of the first and the second users.

In embodiments of the invention, the method comprises comparing the received data responsive to the first user with data (preference-data) indicative of user preferences of at least one of the first and second user; determining whether there is a match between the received data and the preference-data of at least one of the first and the second user; and if a match is found, providing PTS information to at least one of the first and second user.

In embodiments of the invention, the method comprises determining a position of a PTS vehicle used by the first user, based on the received data relevant to the PTS responsive to the first user.

In embodiments of the invention, the preference-data stipulate constraints about at least one of the following: desired trip, quality of transportation, quality of operation, and socially relevant features.

Furthermore, there is provided in accordance with an embodiment of the invention, a system for providing information relevant to a public transportation system. In embodiments of the invention, the system comprises a communication module for receiving data relevant to the PTS responsive to a first user while the first user is using the PTS; a memory for storing a set of instructions; and a processor for executing the set of instructions for processing the received data; wherein the communication module provides data relevant to the PTS to at least one of the first and a second user responsive to the received data.

In embodiments of the invention, the system comprises at least one program, wherein the at least one program is stored in the memory, wherein the at least one program includes instructions for acquiring data relevant to the PTS responsive to the first user while the first user is using the PTS; and instructions for providing data relevant to the PTS to at least one of the first and the second users responsive to the acquired data.

There is further provided, in accordance with an embodiment of the invention, a computer-program product. The computer-program product comprises, in embodiments of the invention, a computer readable storage medium and a computer program mechanism embedded therein, wherein the computer program mechanism comprising instructions, which when executed by a system for providing information relevant to a public transportation system, causes the system to: acquire data relevant to the PTS responsive to a first user while the first user is using the PTS; and provide data relevant to the PTS to at least one of the first and a second user responsive to the acquired data.

In the discussion unless otherwise stated, adjectives such as "substantially" and "about" modifying a condition or relationship characteristic of a feature or features of an embodiment, are understood to mean that the condition or characteristic is defined to within tolerances that are acceptable for operation of the embodiment for an application for which it is intended.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

It should be understood that, the terms "first", "second", etc. may be used herein to distinguish one element from another. For example, at least one first user of Tranzmate-user could be termed as at least one second user or PTS user, and vice versa, without departing from the scope of the disclosed embodiments. Furthermore, the term PTS user or Tranzmate user may be referred to as any natural person, legal person or entity operative to provide and receive data from the Tranzmate system. In addition, when reference is made to a PTS user, this may not necessarily refer to a person currently using the PTS but, for example, also to a person who might use the PTS in the future.

It should be understood that where the claims or specification refer to "a" or "an" element, such reference is not to be construed as there being only one of that element.

BRIEF DESCRIPTION OF FIGURES

Non-limiting examples of embodiments are described below with reference to figures attached hereto that are listed following this paragraph. Identical structures, elements or parts that appear in more than one figure are generally labeled with a same numeral in all the figures in which they appear, and a numeral labeling an icon representing a given feature in a figure may be used to reference the given feature. Dimensions of components and features shown in the figures are chosen for convenience and clarity of presentation and are not necessarily shown to scale.

DETAILED DESCRIPTION

In the detailed description below aspects of embodiments of the invention are discussed with respect to a Tranzmate system operative to provide a Tranzmate-user or Tranzmate-users with PTS information, optionally customized and/or substantially in real-time.

Figure 1:
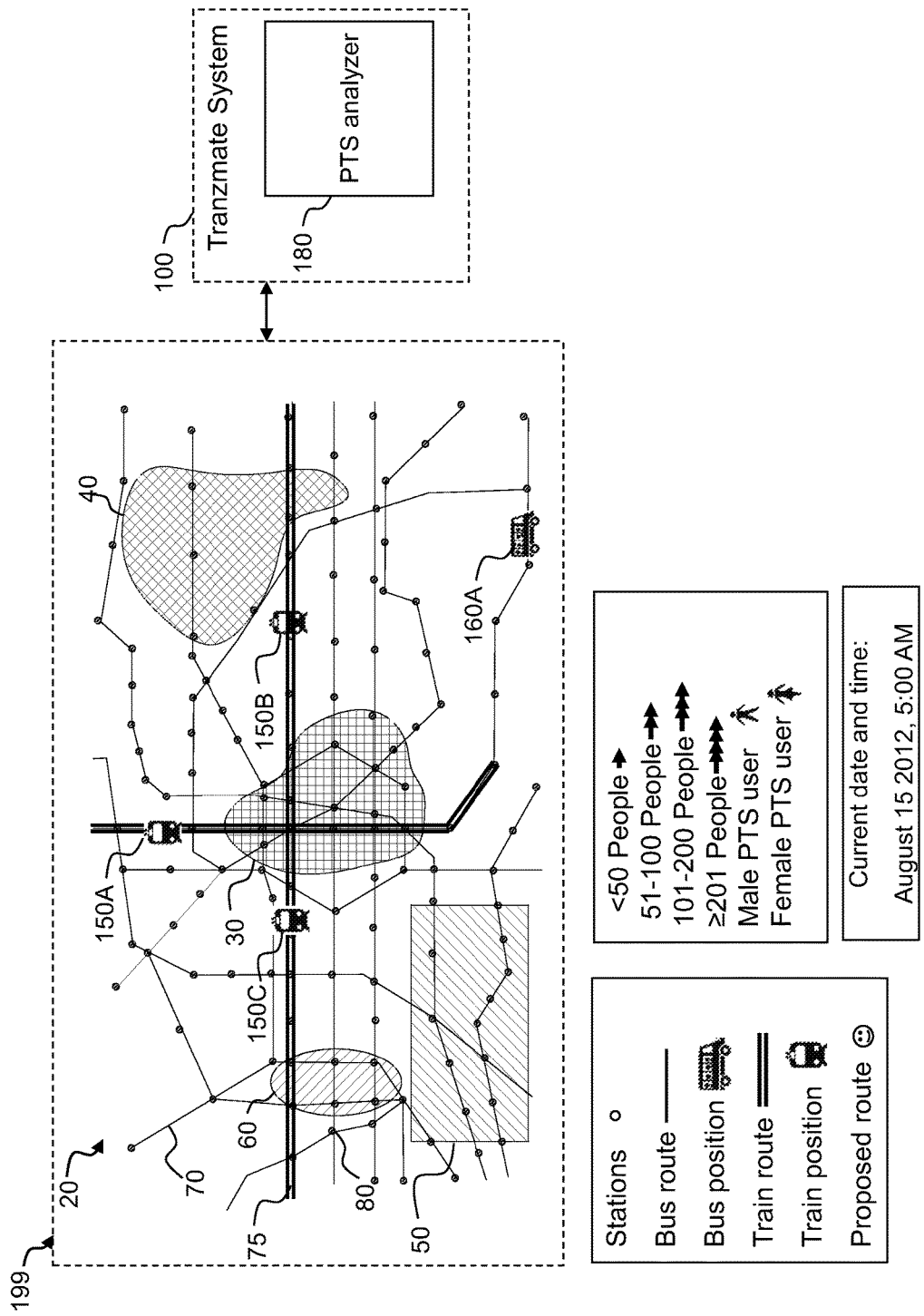
FIG. 1 schematically shows a Tranzmate system and a schematic map of a geographic region served by a PTS for which the Tranzmate system provides PTS information, in accordance with some embodiments.

Reference is now made to FIG. 1, which schematically shows a Tranzmate system 100 and a schematic map 20 of a geographic region served by a PTS 199 for which Tranzmate system 100 provides PTS information, in accordance with some embodiments. PTS vehicles employed by PTS 199 include trains, which are represented by train icons labeled by alphanumeric labels 150A, 150B and 150C and buses, which are represented by bus icons labeled by alphanumeric labels 160A and 160B. Bus routes are represented by single solid lines labeled by alphanumeric labels 70, and train routes are represented by a pair of bold and closely spaced parallel solid lines labeled by alphanumeric labels 75. Stations along the routes are represented by circles labeled by alphanumeric label 80.

Clearly, the number and type of PTS vehicles referred to herein with respect to PTS 199 is not to be construed as limiting and is for exemplary purposes only. Correspondingly, PTS vehicles may comprise any vehicle that may travel along a substantially fixed route, according to an established schedule for a fare, such as buses, minivans, trams, trollies, trains, subways, aircrafts, watercrafts (e.g., ships, boats or ferries), cable cars; and/or vehicles providing transportation services for hire such as, for example, taxi-cabs.

The geographic region which is served by PTS 199 comprises a business center represented by area 30, a recreational area represented by area 40, a college campus represented by area 50, and an industrial area represented by area 60.

PTS information may comprise data, "phy-data", that is descriptive of a physical state of PTS 199 and data, "psy-data", descriptive of socially relevant features of PTS 199.

Phy-data may, for example, be descriptive of the infrastructure of PTS 199 such as, for example, passenger and/or PTS vehicle travel patterns, as a function for example of routes; the number and location of stops, stations and/or terminals along the routes; PTS vehicle velocity (including, e.g., indication of slowdown due to traffic congestions), types and conditions of the PTS vehicles that travel the routes; position, direction and/or destination (name of city, street, neighborhood and/or indication of a public event) of a PTS vehicle and/or of a PTS user or users; timetable schedules; state of a PTS route (e.g., state of stop/stations such as seating comfort and/or cleanliness; environmental comfort such as, for example, temperature and humidity; state of air conditioning and/or heating systems; state of furniture; indication about the driving behavior of a driver of a PTS vehicle; availability of wireless communication access; existence and state of disability access; indication about PTS user flow (e.g., how many PTS users went on and/or off at a particular stop or station); wait times at stops and stations, indication and/or forecasting of the movement of crowds of people; headways; sleeping accommodations; passenger load factor; passenger load and/or capacity in PTS vehicles and/or at stops and stations; location of PTS user congestions; PTS user wait times at stops and stations; delays; PTS vehicle dwell time at a stop; number of PTS users waiting for a particular trip at a given time of the day, day of the week, and/or season; indication of whether there is a conductor, location of conductor and, optionally, if the conductor is checking the validity of the tickets; indication of presence of law enforcement personnel; about suspicious persons and or articles on the PTS vehicle; and/or information related to private transport infrastructures such as, for example, parking lots and/or access roads to stops, stations and/or terminals. Data about weather conditions, traffic congestions, maintenance operations, PTS disruptions (e.g., due to malfunction or engine breakdown of PTS vehicle, or maintenance work on PTS line) and accidents that affect operation of PTS 199 may also be considered phy-data. Some of the phy-data may be derived from ratings provided by users while using the PTS.

Psy-data may comprise socially relevant data about PTS users such as, for example, gender; age; profession; education; marital status; interest profiles; religious affiliation, indication about why the PTS user is using a particular route; and/or interest profiles (e.g., romantic preference, preference on how to spend leisure time). Psy-data may also be descriptive about the PTS users' internet activity such as, for example, online or offline status and/or descriptive of the content of internet pages being visited by users of PTS 199 (e.g., which user is logged into which online social networking platforms (e.g., "Facebook", Twitter, "Google+", and/or "LinkedIn").

In some embodiments, psy-data may be indicative of the income of PTS users. Tranzmate system 100 may generate an estimate about a PTS user's income. An income estimate may for example be generated by analyzing the travel pattern of PTS users with respect to their place of residence and cross-referencing their place of residence with the income statistics of the respective residence communities.

In embodiments, at least some of the psy-data may be inferred from the behavior of the PTS users as evidenced from, and by use of, the PTS users' communication devices. For example, tracking the location of the communication devices allows determining motion patterns of the communication devices. Travel patterns may then be inferred from the motion patterns and associated to the PTS user.

Preference-data may be descriptive of user preferences that define constraints related to PTS 199. The constraints may be stipulated, for example, by queries submitted to Tranzmate system 100 by the Tranzmate-user. The queries may for example ask for PTS information about trips meeting one or more of the following constraints: that most passengers on the trip transit are above a certain age; that there are more women than men on the trip transit; that the probability to find a romantic partner is highest and/or that there is no transit through a particular neighborhood. The constraints may also relate to the minimum and/or maximum number of stops during the trip and/or regarding PTS vehicle appurtenances for the trip. Moreover, the queries may stipulate constraints to receive PTS information only about trips which are or will also used by friends or a selected friend of the Tranzmate-user.

In some embodiments, preference-data may comprise data inferred from the behavior of the Tranzmate-user as evidenced from, and by use of, the Tranzmate-user's communication device. For example, tracking the location of the communication device allows determining motion patterns of the communication device. Travel patterns may be inferred from the communication device's motion patterns and associated to the Tranzmate-user.

At least some of phy-data, psy-data and/or preference-data may include time-stamps indicative of the time of recordation of the phy-data, psy-data and/or preference-data. Data provided by the communication devices may be time stamped with the time of generation by the communication device. Data provided by entities of PTS 199 may be time stamped with the time of generation of the data by the entities of PTS 199.

In some embodiments, phy-data, psy-data and/or preference-data may be binary (e.g., indicative of the availability of seats on a PTS vehicle ("YES"/"NO")) and/or qualitative (e.g., indicative of the level of comfort of seating from 1 to 5 from "not comfortable" to "very comfortable", respectively) and/or quantitative (e.g., indicative of the number of available seats).

In some embodiments, Tranzmate system 100 comprises a PTS analyzer application or PTS analyzer 180 that is operative to provide the Tranzmate-user, substantially in real-time, with PTS information that is related to PTS 199. PTS analyzer 180 is operative to analyze data related to PTS 199 which may be received from various sources such as, for example, from a static data source, a statistical data source, operator data source and/or a crowd data source. A more detailed description of Tranzmate system 100 and PTS analyzer 180 is given below with respect to FIGS. 3A to 3C.

Figure 2A:
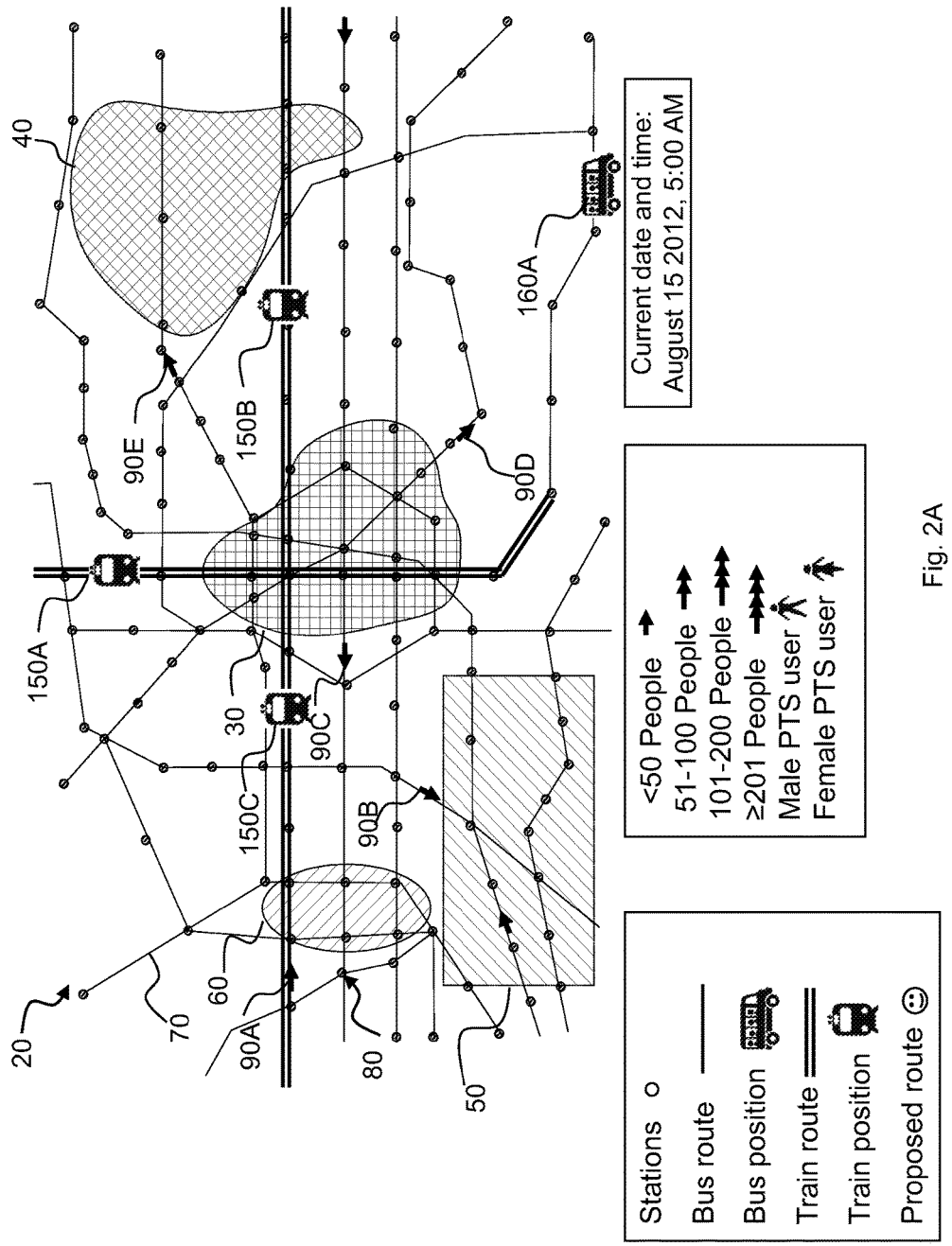
FIGS. 2A to 2C show snapshots of schematic maps of the PTS of FIG. 1 taken at different times of the day that schematically illustrate the operation of the Tranzmate system, in accordance with some embodiments.
Figure 2B:
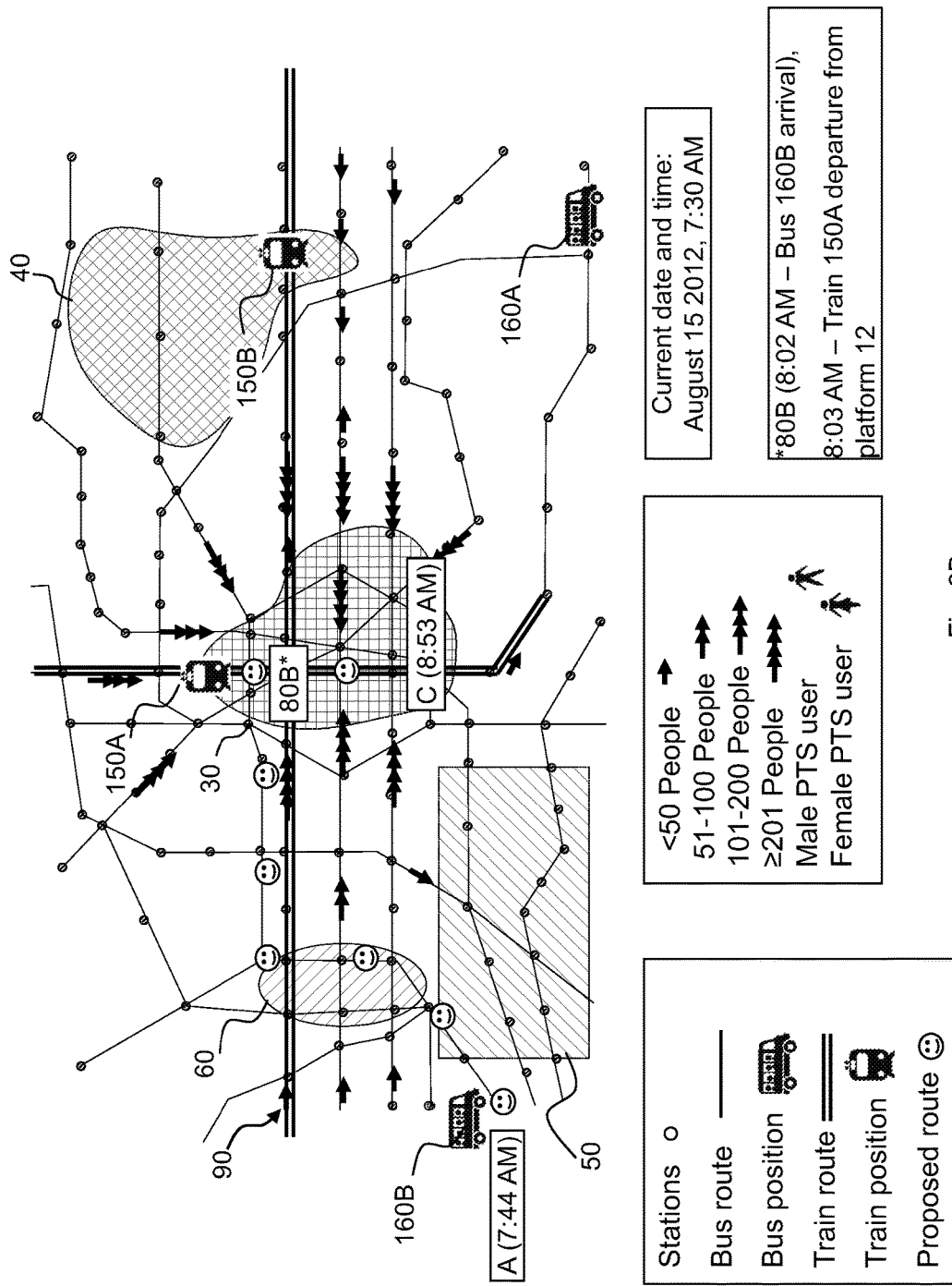
Figure 2C:
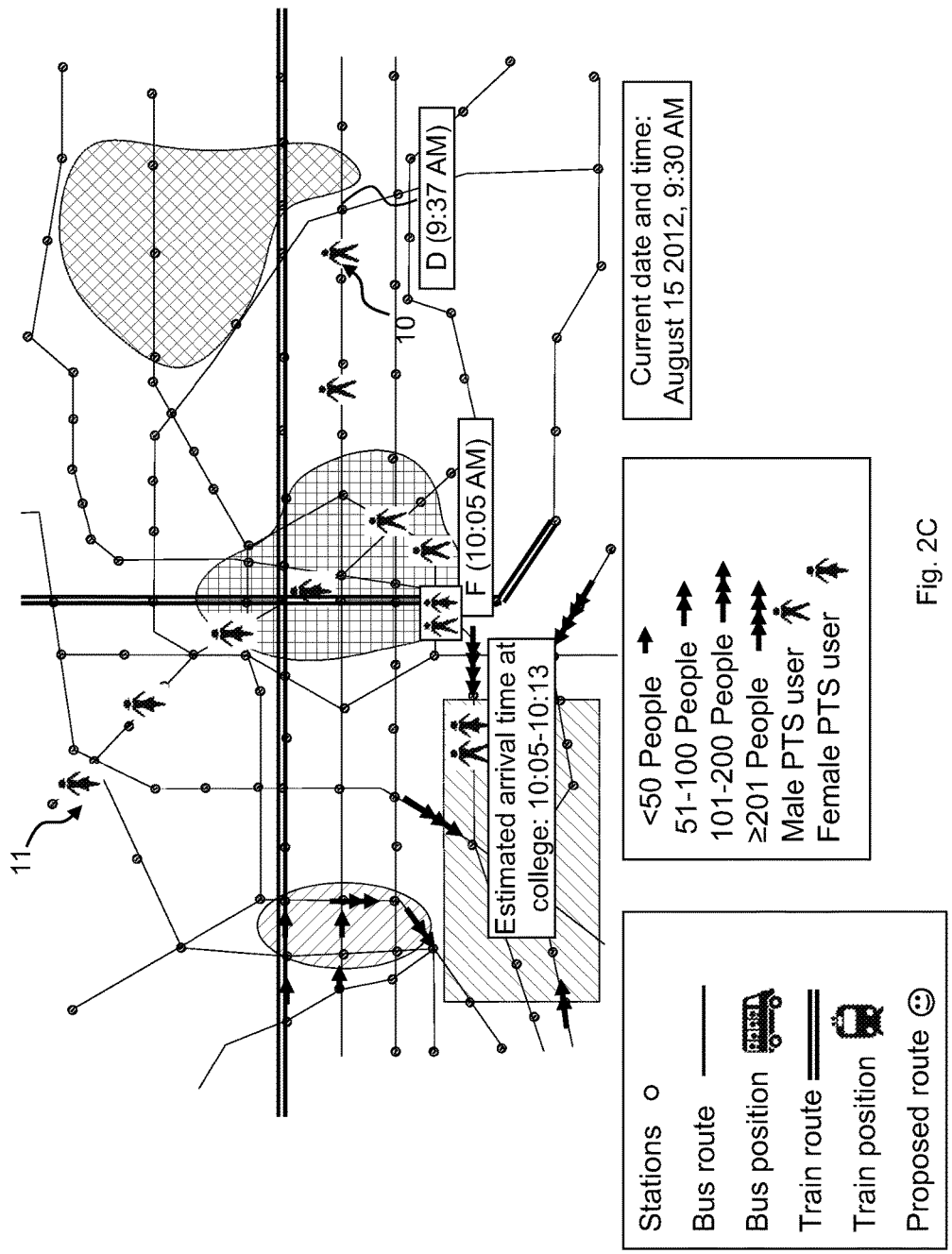

Additional reference is now made to FIGS. 2A to 2C, which show snapshots of schematic maps 20 of PTS 199 of FIG. 1, taken at different times of the day, to schematically illustrate operation of Tranzmate system 100, in accordance with some embodiments.

PTS analyzer 180 may for example be operative to receive from a Tranzmate-user at 5:00 AM a request to provide information about the current location of trains 150A-150B and bus 160A of PTS 199. In response to the request, PTS analyzer 180 may identify the position of trains 150A-150B and of bus 160A. As shown in FIG. 2A, the location of trains 150A-150B and bus 160 in the given geographic area may then be schematically displayed to the Tranzmate-user, on map 20, substantially in real-time (e.g., at 5:00 AM) via the Tranzmate-user's communication device.

It should be noted that the term "display" used herein as well as grammatical variations thereof refers to any output modality suitable for providing information such as, for example, a visual, aural and/or tactile output modality.

The location of PTS vehicles such as trains 150A-C and buses 160A-160B on map 20, according to embodiments of the invention, may be configured to be displayed in conjunction with information relating to a source of the location information. Location data may be available from a number of sources. For example, a location of a bus or train may be based on schedule data, such as bus or train timetables which provide scheduled arrival and departure times of a bus or train along destinations of a route based on scheduled time of departure. Another source of location information may be real-time location of a bus or train as received by Tranzmate system 100 through users of PTS 199. Such location information may be "passive location information," passively received by Tranzmate system 100 or may be "active location information," actively generated by users of PTS 199.

"Passive location information" is information collected by a Tranzmate system 100 without a user's active input of location. For example, a location of a communication device affixed to a PTS vehicle allows determining motion patterns of the communication device, and thereby determines the position of the PTS vehicle. An additional example of passive location information relates to travel patterns inferred from a Tranzmate user's communication device's motion patterns and associated to a Tranzmate-user.

"Active location information," is information collected by a Tranzmate system 100 through a user's active input of location. For example, a user may engage a Tranzmate system, via a mobile communication device, while standing at a bus stop, to receive information about buses which may be available to take the user to his/her destination. After the user engages the Tranzmate system, Tranzmate system 100 may detect a change in location of the user, for example, via GPS signaling, and may prompt the user with a question regarding if the user has alighted on to a bus or the identity of the bus line. The user may then respond via a mobile communication device, regarding the identity of the bus line alighted. Tranzmate system 100 may then correlate the user's location with a bus of a particular bus line identified by the user.

Another example of "active location information" may be based on a social media interaction. For example, a Tranzmate user may alight on a train of a particular line and may subsequently "check-in" via his mobile communication device using a social media application such as Facebook®, Twitter®, Foursquare® or the like, for example using a message such as, "I'm heading to Tel Aviv via the 8:31 train from Dimona." Tranzmate system 100 may be linked with the social media application and may then identify, in real time, the position of a train based on the location of the user's mobile communication device. The source of the location information, once identified by the Tranzmate system, may be indicated in conjunction with the location information. For example, with reference to FIG. 2A, train 150A location may be determined by Tranzmate system 100 via a train timetable, and may be designated by showing an grey colored icon as train 150A (color not shown in FIG. 2A). Train 150B location may be determined by Tranzmate system 100 via passive location information, for example by a position tracking device located on train 150B, and may be designated by showing a blue colored icon as train 150B (color not shown in FIG. 2A). Train 150C location may be determined by Tranzmate system 100 via active location information, and may be designated by showing an orange colored icon as train 150C (color not shown in FIG. 2A). A user reading a color-coded map may associate different levels of accuracy to the location of trains based on the source of information. For example, a user of PTS 199 who knows that the local train timetables are likely to be inaccurate at a specific time of day, may rely more on location data which is based on passive location information and/or active location information than on schedule location information.

In addition to color-coding to identify sources of information on map 20, Tranzmate system 100 may use different icons to identify different sources of information. For example, a bus whose location is identified by active location information may be designated as a bus icon with a traveler, and a bus whose location is identified by passive location information may be designated as a bus icon without any travelers.

According to an embodiment of the invention, a Tranzmate user who provides active location information may be identifiable to other Tranzmate users. For example, a Tranzmate user named Jacob Jones having a user name "J-bone" submits information to Tranzmate system 100 that he is located on train 150C. Tranzmate system 100 may be configured to allow other Tranzmate users to see, on a map 20, or upon designating an icon located at train 150C, the identity of Jacob Jones by either displaying his name or by displaying his user name "J-bone."

According to an embodiment of the invention, a user may designate that his identity, such as his name or user name, be disclosed only to certain individuals, for example, his friends or contacts in a social network which may be associated with or linked to Tranzmate system 100. Alternatively, user may allow his identity to be public to allow all users of Tranzmate system 100. A user may designate "security settings" regarding visibility of his input of information, either through active or through passive location information, to other users of Tranzmate system 100.

According to an embodiment of the invention, a Tranzmate system 100 may allow a user to contact, via users' mobile communication devices, another user of a Tranzmate system. Such a communication may be through a written message, an audio message, a video message and/or a telephonic call. For example, a Tranzmate user, Kate Kohen, who has traveled on train 150C and left her jacket on the train, may access a Tranzmate system 100 to find other Tranzmate users on train 150C. Kate Kohen may, via map 20 identify that user J-bone is on that train. Kate Kohen may open a communication channel, via a text message to J-bone, to ask if he may look for Kate Kohen's jacket and leave it at a "lost and found" area at the train stop that J-bone will leave the train. Alternatively, a Tranzmate user, Bob Billstein, who is interested in traveling on train 150C and is sensitive to odors, via map 20 may identify that user J-bone is on that train. Bob Billstein may telephonically call J-bone via Tranzmate system 100 to ask him if his train car has any malodourous odors.

With regard to display of PTS vehicles on map 20, as mentioned above, location of PTS vehicles may be determined, according to embodiments of the invention based on various sources including: schedule location information, passive location information and/or active location information. In situations in which a PTS vehicle is located between stops, schedule location information may not be readily available or accurate. Nevertheless, Tranzmate system 100 may display locations of PTS vehicles between stops, based on time elapsed since last location information provided (schedule, passive or active) and average speed of travel for various distances between stops.

According to an embodiment of the invention, a Tranzmate system 100 may display location information provided prior to the current date. For example, with relation to FIG. 2B, which represents a PTS 199 at Aug. 15, 2012 at 7:30 AM, the Tranzmate system may have received active location information regarding bus 160A at the same date at 7:20 AM from user J-bone, but has no location information regarding bus 160A which is newer than 7:20 AM. Tranzmate system 100 may provide a location of bus 160A based on the active location information provided by user J-bone at 7:20 with a projection of estimated speed of travel for bus 160A, thereby displaying bus 160A at 7:30 AM at a projected location, that is point further along its route than the location provided by J-bone at 7:20. Tranzmate system 100 may display to a Tranzmate user the time of latest information by indication of "last info received 7:20 AM" next to the bus icon displayed at 160A. A user may then infer that the provided information is not accurate in real time, but is based on a projection from data received at 7:20 AM.

In some embodiments, Tranzmate system 100 is operative to determine, via respective communication devices, the direction of movement of users of PTS 199. As shown in FIGS. 2A to 2C, the travel pattern may be schematically illustrated in maps 20 with arrows 90, wherein the number of overlapping arrows pointing in the same direction may correlate with the size of the crowd of people heading in that particular direction. For example, one arrow may represent a crowd comprising up to 50 PTS users, two overlapping arrows may represent a crowd comprising between 51 and 100 PTS users, three overlapping arrows may represent a crowd comprising between 101 to 200 PTS users, and four overlapping arrows may represent a crowd comprising 201 or more PTS users. Correspondingly, arrow 90 may hereinafter also be referred to as "crowd vector" 90.

As already outlined herein above, FIG. 2A may, by way of example only, show a snapshot of map 20 of PTS 199 taken at 5:00 AM, wherein each crowd vector 90A-90E represents a corresponding number of PTS users heading in various directions. Crowd vector 90A may for example be associated with a janitor heading towards business center 30, and crowd vector 90C may be associated with maintenance workers leaving business center 30 after a completing a night shift. Clearly, the number of crowds referred to herein is for illustrative purposes only and should by no means to be construed as limiting.

As further exemplified with respect to map 20 shown in FIG. 2B, the snapshot taken at 7:30 schematically indicates a much denser passenger load than map 20 of FIG. 2A. In addition, map 20 of FIG. 2B displays that more PTS users are currently heading toward business center 30 than map 20 of FIG. 2A.

As further exemplified with respect to FIG. 2B, the Tranzmate-user nay stipulate constraints about the usage of PTS 199, such as making a trip from origin A to destination C to suggest a route from A to C that is least crowded with PTS users and to arrive at destination C no later than 9:00 AM.

It should be noted that the term "destination" as used herein may relate to an address; a PTS stop, the location of a venue, and/or an area of interest such as, for example, a business center and/or a recreational area.

In some embodiments, Tranzmate system 100 may also take into account as preference-data, e.g., automatically, the current position of Tranzmate-user relative to origin A and estimate, for example, the time it might take the Tranzmate-user to walk and/or bicycle from his or her current position to origin A.

In response to the preference-data provided by the Tranzmate-user, PTS analyzer 180 may search for a PTS route meeting the constraints by acquiring phy-data that may be indicative of the PTS routes that enable transit from origin A to destination C, indicative of passenger load along the various alternative PTS routes, and indicative of the respective arrival times at destination C. Based on the received phy-data, PTS analyzer 180 may then determine which PTS route meets the constraints and display to the Tranzmate-user the respective PTS information. For example, in the snapshot of map 20 of PTS 199 taken at 7:30 AM, the PTS route meeting the Tranzmate-user's preferences may be represented by "Smiley" icons arranged along said PTS route. As can readily be seen, the proposed route bypasses PTS routes that are most densely populated. In some embodiments, PTS information may include time indications. For example, time arrival estimations may be shown in association with the "Smiley" icons.

PTS information may also indicate the departure time of bus 160B, arrival time estimation (e.g., 8:53 AM) of the Tranzmate-user at destination C when taking the proposed PTS route, indication about PTS time schedules and location of changes to be made by the Tranzmate-user along the proposed route (e.g., arrival of bus 160A at station 80B 8:02 AM, and departure of train 150B from platform 12 of station 80B at 8:03 AM).

As further exemplified herein below with respect to FIG. 2C, Tranzmate system 100 is also operative to receive and process preference-data related to socially relevant features of PTS 199. For example, a Tranzmate-user may be a male college student providing, e.g., at 9:30 AM, preference-data defining his desire to travel from station 80D to college campus 50, to arrive at college campus 50 not later than 10:15, and to meet, on his route to college campus 50, a female classmate.

Tranzmate system 100 may then search for a PTS user meeting the constraints stipulated by the Tranzmate-user by acquiring psy-data that may be indicative of the age, gender, college affiliation, year of class, romantic preferences, marital status of PTS users and by acquiring phy-data that may be indicative of the travel patterns of the PTS users. Based on the acquired phy-data and/or psy-data, PTS analyzer 180 may then determine the identity of a female passenger who meets the constraints defined by the Tranzmate-user.

A snapshot of map 20 of PTS 199 taken at 9:30 AM, along with a proposal to the male college student of a route to college campus 50 for which he has a relatively high probability of engaging with the female classmate, may then be displayed to the male college student via the communication device with which the male college student is associated. The proposed route may, for example, be represented by icons which are illustrative of a male person arranged along the proposed route, wherein the icons are labeled by alphanumeric label 10. In some embodiments, PTS information may include an estimate of a route forecast of the PTS user who meets the constraints defined by the male college student. The route forecast of the PTS user meeting the constraints may, for example, be represented by icons which are illustrative of a female person arranged along the route, wherein the icons are labeled by alphanumeric label 11.

In some embodiments, PTS information may include an indication about the location and/or time when there is high probability for the male college student to engage with the female classmate. By of way of example, map 20 may schematically indicate that male college 10 student has high probability to engage with female classmate 11 at location F at 10:05 AM. PTS information may further comprise time estimates such as, for example, an arrival time estimate at college campus 50 (e.g., 10:04-10:13 AM).

Figure 3A:
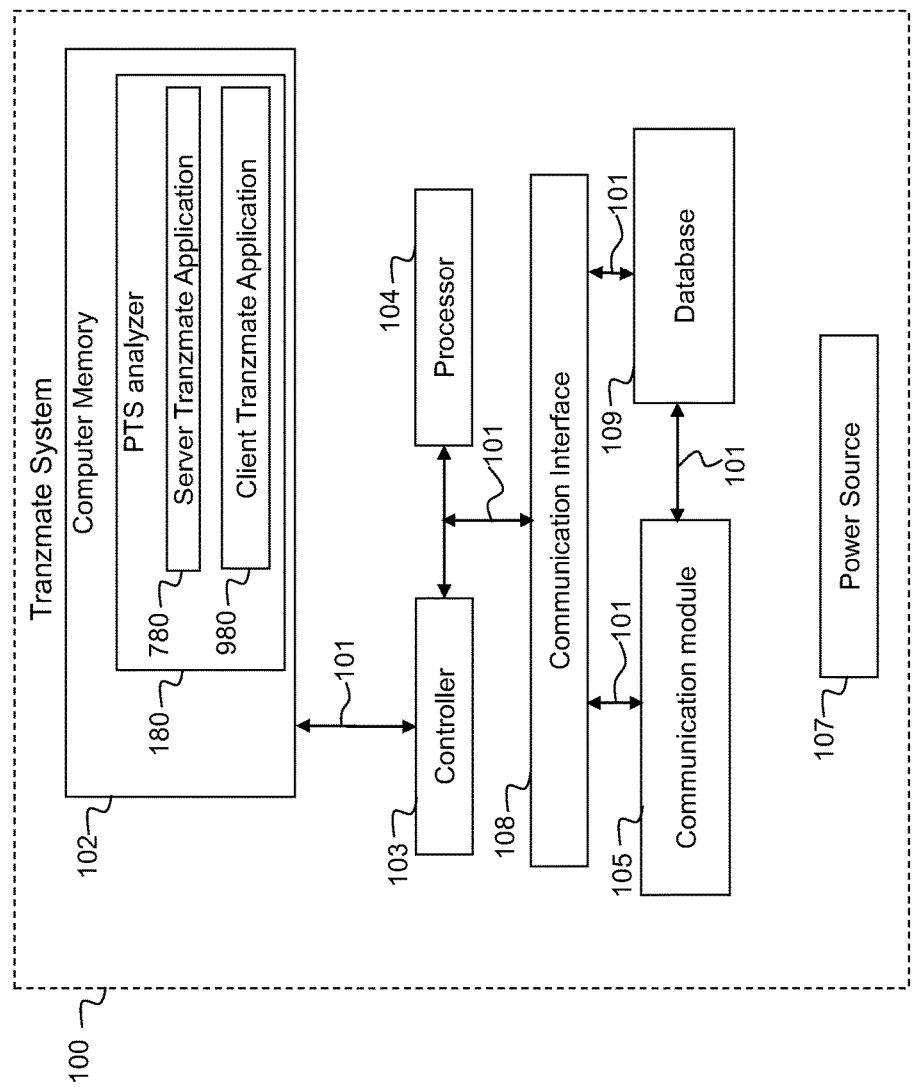
FIG. 3A schematically illustrates a block diagram of the Tranzmate System, in accordance with some embodiments.

Additional reference is now made to FIG. 3A, which schematically illustrates a block diagram illustration of Tranzmate system 100, in accordance with some embodiments.

Tranzmate system 100 may include a computer memory 102 (which may include one or more computer readable storage mediums), a controller 103, a processor 104, a communication module 105 of a communication network (not shown), and a database 109, which may communicate with each other over one or more communication links 101. Tranzmate system 100 may also comprise a power source 107 for powering the various components of Tranzmate system 100. Communication module 105 is operative to receive and provide data, e.g., via wire and/or wireless communication systems. Tranzmate system 100 may further include a communication interface 108 that couples communication module 105 with processor 104 and computer memory 102. The one or more processors 104 run or execute various sets of instructions stored in computer memory 102 to perform various functions such as processing phy-data, psy-data and/or preference-data resulting in PTS analyzer application or PTS analyzer 180.

As already discussed hereinabove with respect to FIG. 1 and FIGS. 2A-2C, PTS analyzer 180 may for example be operative to compare the preference-data with the phy-data and/or psy-data and provide the Tranzmate-user with PTS information comprising phy-data and/or psy-data that meets the constraints related to the preference-data. Phy-data and/or psy-data representing the PTS information may be provided to the respective communication device with which the Tranzmate-user is associated, from computer memory 102 via communication module 105.

Figure 3B:
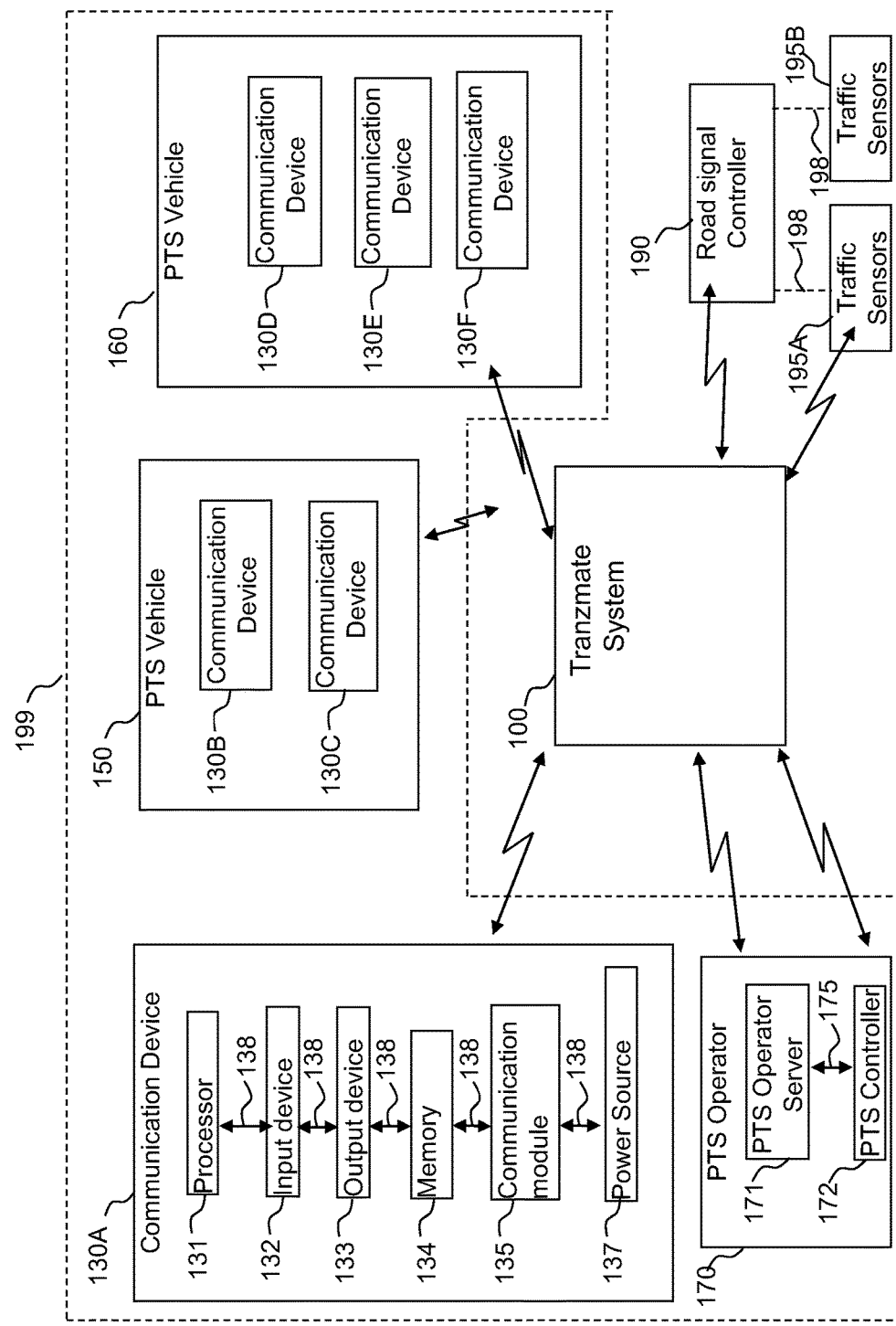
FIG. 3B schematically illustrates a block diagram of the interaction of the Tranzmate system with the PTS, in accordance with some embodiments.

Further reference is made to FIG. 3B, which schematically illustrates a block diagram of the interaction of Tranzmate system 100 with PTS 199, in accordance with some embodiments. By way of example only, PTS 199 may be associated with a multitude of communication devices 130 (e.g., communication devices 130A-130G) and comprise a multitude of PTS vehicles, e.g., PTS vehicles 150-160 and a PTS operator 170. PTS operator 170 may comprise a PTS operator server 171 and a PTS controller 172, which may communicate with each other via communication link 175.

Communication devices 130A-130G, PTS vehicles 150-160, PTS operator 170 and Tranzmate system 100 may be communicably connected with each other, e.g., via the communication network.

Each one of communication devices 130A-130G may be embodied, for example, by a mobile communication device like, for example, a mobile navigation device (e.g., a Global Positioning System); a cellular communication device, a cellular phone; a multifunction portable device; a "Smartphone", a cellular device, a cellular communication device, a tablet computer, a notebook computer, an "Ultrabook" computer, a personal digital assistant (PDA), a laptop computer; or by a stationary communication device such as, for example, a desktop computer, an onboard device like, e.g., a dashboard device; workstations and/or terminals (e.g., ticketing or vending machines).

A communication device such as, for example, communication device 130A, may include a processor 131, an input device 132, an output device 133, a memory 134, a communication module 135 which may communicate with each other over one or more communication buses or signal lines 138. Communication devices 130A-130G may also include a power source 137, for powering the various components.

Communication devices 130 are operative to transmit and receive data via the communication network from memory 134 through communication module 135, which may be controlled by processor 131. In some embodiments, memory 134 may comprise and/or execute client Tranzmate application 980.

In some embodiments, PTS operator server 170 may be implemented, for example, by any suitable software and/or hardware component or components such as, for example, a Network computer.

The location of communication devices 130A-130G, and/or of PTS vehicles 150-160 may be determined by employing, for example, a GPS, Radio-frequency identification (RFID), signal strength measuring techniques, triangulation techniques (e.g., within a local area network) and/or any other technique that enables assessing the position of at least one of communication devices 130A-130G and/or of PTS vehicles 150-160.

In some embodiments, Tranzmate system 100 may be operative to identify at least one or a plurality of first Tranzmate-users of at least one of communication devices 130A-130G, for example, in relation to a particular Tranzmate-user ID (e.g., Tranzmate username, password, and/or email-address), the communication device's ID, telephone operator subscriber data, internet protocol address, and/or based on personal identification-data provided to login to web-based Email and/or social networking platforms such as, for example, "Facebook", Twitter, "Google+", and/or "LinkedIn") and/or web-based dating platforms. Psy-data indicative of the ID of the at least one or plurality of first Tranzmate-users may be received at, e.g., communication device 130A, via input device 132 and/or communication module 135 and displayed to a second Tranzmate-user via output device 133. Tranzmate system 100 may also display the second Tranzmate-user, optionally substantially in real-time, which users (e.g., Facebook "friends") or group members (e.g., of linkedin "groups") are on which route of PTS 199.

Although embodiments may be discussed herein for the sake of clarity and simplicity with respect to communication device 130A, this should be no means to be construed as limiting. Consequently, features and/or operations and/or activities that are described in association with communication device 130A may additionally or alternatively also be implemented with other communication devices.

In some embodiments, Tranzmate system 100 may be operative to receive data from various entities and provide data to various entities associated with PTS 199. Tranzmate system 100 may for example receive phy-data and/or psy-data from at least one of communication devices 130A-130G; PTS vehicles 150-160 and/or PTS operator server 170. For example, Tranzmate system 100 may receive data from any one of communication device 130A-130G, PTS vehicles 150-160 and PTS operator server 170. Further sources of data include ticket vendor machines, and onboard PT computers (e.g., a computer terminal installed in a PTS vehicle).

In some embodiments, phy-data and/or psy-data may be based, inter alia, on preference-data received from a multitude of Tranzmate-users such as, for example, ticket purchases and/or queries indicative about the romantic preferences of Tranzmate-users.

In some embodiments, phy-data and/or psy-data may be received responsive to PTS users actively providing, while using PTS 199, the phy-data and/or psy-data, e.g., responsive to a prompt issued by Tranzmate system 100 to do so. Accordingly, in some embodiments, Tranzmate-system 100 may poll or survey PTS users regarding phy-data and/or psy-data.

Tranzmate system 100 may for example prompt a PTS user, a conductor or PTS operator server 170 to provide data descriptive of, for example, the passenger density and/or gender and/or age of the PTS users on board PTS vehicle 150. PTS users may also provide Tranzmate system 100 data actively, for example, responsive to solicitation of the PTS users to provide data about the physical and/or socially relevant features of the PTS in exchange for a redeemable certificate (hereinafter also referred to as "rider coupon"). The rider coupon may for example grant a discount on a PTS fare, or provide a free coffee at a coffee bar accessible using the PTS.

In some embodiments, the Tranzmate-user may, while using PTS 199, provide Tranzmate system 100 with psy-data that is indicative of the user's consumer preferences in relation to a given business or service provider. In response, Tranzmate system 100 may estimate the Tranzmate-user's time of arrival at the geographic location of the given business or service. The psy-data indicative of the Tranzmate-user's consumer preferences and time of arrival estimate may then be forwarded to the given business or service. This enables the given business or service provider to make advance preparations for serving the Tranzmate-user without any substantially delay, i.e., "just-in-time". The business may for example be a bakery that receives an order from the Tranzmate user while the Tranzmate user is using the PTS. The Tranzmate system may provide the bakery, along with information comprising the order, an estimate of when the Tranzmate user is expected to arrive at the bakery. The estimate may be based on positioning system information provided by the communication device associated with the Tranzmate user. One or more of the bakery's personnel receiving the order and time of arrival estimate may use the time of arrival estimate to provide the Tranzmate-user with a "just in time" fulfillment of the order upon the Tranzmate-user's arrival.

In some embodiments, data may be provided passively by the PTS users, for example, responsive to monitoring the behavior of the PTS users as evidenced from use of the communication devices 130A-130G with which they are associated including, for example, monitoring and analyzing the travel pattern of the PTS users.

In some embodiments, phy-data and/or psy-data may be analyzed automatically without active stipulation for analysis by the Tranzmate-user. For example, PTS analyzer 180 may determine that PTS users associated with communication devices 130B-130C follow a first travel pattern, e.g., between 7 AM and 9 AM, and that PTS users associated with communication device 130D-130F follow a second travel pattern, e.g., between 8:30 AM to 10:30 AM, during a second time period. PTS analyzer 180 may thus, for example, in relation to the first time period, automatically, i.e., without necessarily being actively stipulated by the users to do so, analyze received phy-data for data that is indicative of a fastest route from suburbs to the city center.

In relation to the second time period, PTS analyzer 180 may automatically analyze, i.e. without necessarily being actively stipulated by the users to do so, analyze psy-data for data that may be indicative of courses being commonly attended, the gender distribution (e.g., indicating a male college student that a particular route to the college destination is predominantly used by female passengers), and/or age distribution. It should be noted that the term "first time period" and "second time period" may be partially overlapping or completely non-overlapping.

In some embodiments, Tranzmate system 100 may provide the Tranzmate-user automatically with a prompt or prompts in relation to the analysis of the Tranzmate-user's behavior. By monitoring the behavior of the Tranzmate-user, Tranzmate system 100 may for example determine that the Tranzmate-user usually starts to commute to his workplace at about 8:00 AM in the morning. The geographic location of the workplace may also be determined by Tranzmate system 100 by tracking the movement of the Tranzmate-user. The Tranzmate-user may therefore be prompted by Tranzmate system 100 before 8:00 AM to provide information regarding the planning of a trip to his workplace, for example as follows: "Good morning, Joe, are you interested that Tranzmate shows you the fastest way to [name of workplace]?".

In some embodiments, responsive to tracking the behavior of the Tranzmate-user(s), Tranzmate system 100 may, for example, provide the Tranzmate-user automatically with PTS information regarding a particular transit the Tranzmate-user usually takes during a given time period of the day. The PTS information may refer to delays, estimation of arrival times of PTS vehicles at stop or station of origin, passenger load, and proposals about alternative routes, redirection, and the like, to timely arrive at the destination of the particular transit.

In some embodiments, a machine-readable code may encode data related to PTS 199. For example, a machine-readable code (e.g., barcode, QR code) provided on PTS vehicle 150 may represent a PTS vehicle's route. For example, a PTS user riding PTS vehicle 150 may provide Tranzmate system 100 with data about his or her travel itinerary by reading the machine-readable code using the PTS user's communication device and forwarding the acquired data to Tranzmate system 100.

Phy-data and psy-data acquired from users of PTS 199 may be referred to as "crowd data". Phy-data and psy-data may also be provided by computers and personnel that operate, monitor, and maintain the PTS, and may be referred to as "operator data". Phy-data and psy-data that may generally be considered constant for relatively extended periods of time may be referred to as "static data". Static data may for example comprise data that characterizes features, such as by way of example, vehicle routes and stations of the physical infrastructure of the PTS that change slowly. Phy-data and psy-data may be characterized as "statistical data" generated by analysis of many instances of data acquired for the PTS. Statistical data for example may comprise a median, an average and associated standard deviation for a number of PTS users using a particular route of the PTS, optionally as a function of time, such as time of day or day of the week. It is noted that any particular instance of data may be classified as belonging to more than one of the types of data noted above. For example, an instance of phy-data or psy-data that is both statistical and crowd data may be statistical data generated responsive to statistical analysis of crowd data.

In some embodiments, the phy-data and/or psy-data are compared with preference-data, e.g., by PTS analyzer 180, the comparison yielding a comparison result. In some embodiments, the source for phy-data and/or psy-data for comparison with preference-data may be selected according to a predetermined selection criterion which may relate, e.g., to the availability and/or accuracy of data descriptive of PTS 199.

Operator data about PTS 199 may for example comprise positioning data provided by an onboard positioning system of a given PTS vehicle. If at one instance for example, the onboard positioning system of a given PTS vehicle is found to be fully and properly functional, the position of the given PTS vehicle may be determined according to the operator's positioning data, rather than according to crowd data received from PTS users currently riding the given PTS vehicle. Conversely, if it is found that the onboard positioning system of the given PTS vehicle is damaged, then the position of the given PTS vehicle may be determined according to crowd data provided by PTS users currently on board the given PTS vehicle.

Furthermore, if at another instance for example it is found that there is no static data available which is indicative of the gender of PTS users using a particular PTS transit, and statistical data based on crowd data and operator data indicative of the gender of PTS users using the particular transit is found to be more accurate than crowd data or operator data alone, the statistical data may be selected for comparison with preference-data. Responsive to the comparison result, the phy-data and/or psy-data may be processed to generate PTS information, e.g., by PTS analyzer 180. The PTS information may be provided to the Tranzmate-user via the respective communication device with which the Tranzmate-user is associated. The PTS information may comprise data, "matching data", descriptive of a "best match" for using PTS 199 by the Tranzmate-user. PTS information may be provided to the Tranzmate-user and, optionally, updated substantially in real-time.

By way of example only, a comparison result may indicate that the travel pattern of communication devices 130B and 130C matches the Tranzmate-user's preference-data better than the travel pattern of communication devices 130D-130F, but that the Tranzmate-user's social preferences are better matched by communication device 130E. Furthermore, the constraints defined by Tranzmate-user's preference-data may, for example, indicate that the Tranzmate-user's social preference outweighs the constraints of the travel patterns of communication devices 130B-130F. As a consequence, PTS information may be provided to the Tranzmate-user which is indicative of the travel pattern of communication device 130E.

In another example, preference-date may relate to a constraint of tracking the position of a particular PTS user. In response, Tranzmate-system 100 may display the Tranzmate-user (e.g., a parent) with PTS information about the position of the selected PTS user (e.g., the parent's child). In some embodiments, Tranzmate system 100 may prompt the particular PTS user for permission to display his or her position to the Tranzmate-user.

In some embodiments, a second Tranzmate-user may receive PTS information from a first Tranzmate-user. For example, a first communication device associated with the first Tranzmate-user may forward or relay, substantially in real-time, PTS information to a communication device of the second Tranzmate-user, e.g., in response to a request issued by the second Tranzmate-user to the first Tranzmate-user. In other words, the second Tranzmate-user may receive PTS information from a plurality of other Tranzmate-users.

In some embodiments, Tranzmate-system 100 may communicably interface with the monitoring and control system of the PTS (hereinafter also referred to as "PTS operator") 170. Tranzmate system 100 may thus provide PTS operator 170 for example with data (e.g., crowd data) which may otherwise not necessarily be available to PTS operator 170. The data may then be used by PTS operator 170 for monitoring and controlling PTS 199. The usage of for example crowd data instead or in addition to static and/or operator data may facilitate a higher quality-of-service.

In some embodiments, PTS 199 may be controlled substantially with no delay responsive to acquired crowd data, i.e., substantially in real-time. Additionally or alternatively, some of the acquired crowd data may stored in database 109 for later usage (i.e., non-real time usage of crowd data).

In some embodiments, Tranzmate system 100 may be operative to enable automated PTS passenger pooling by receiving preference-data from a first communication device of the Tranzmate-user and preference-data from a second communication device of the PTS user, and determining, based on the received preference-data, a PTS usage profile associated with the Tranzmate-user and the PTS user. In some embodiments, if a match is found between the PTS usage profile of the Tranzmate-user and the PTS user, a PTS passenger pooling proposal may be provided to the Tranzmate-user and the PTS user, the PTS passenger pooling proposal taking into account the phy-data and/or psy-data meeting the requirements of the respective preference-data.

In some embodiments, the shared use of at least one of the following modules may be suggested or automatically initiated at the communication devices respective to PTS users for whom a match to preference-data was determined: an instant messaging module, a video conference module, a telephone conference module, a blogging module, a video player module, a music player module, an image management module, and/or a calendar module.

In some embodiments, Tranzmate system 100 is operative to determine which PTS users are on board which PTS vehicle. For example, PTS analyzer 180 may be operative to associate travel patterns to PTS users by tracking their respective communication devices 130B-130F and to associate travel patterns to PTS vehicles 150 and 160. Tranzmate system 100 may be operative to compare the travel patterns of communication devices 130B-130F with the travel patterns of PTS vehicles 150-160 to yield a comparison result. A comparison result indicative of a matching travel pattern may identify which users are on board of which PTS vehicle. For example, Tranzmate system 100 may indicate that PTS users respectively associated with communication devices 130B-130C are on board of PTS vehicle 150 and PTS users associated respectively associated with communication devices 130D-130F are on board of PTS vehicle 160.

In some embodiments, data provided by one user may be compared with data from other users, e.g., for corroboration purposes. For example, phy-data and/or psy-data received from communication device 130 may be corroborated with phy-data and/or psy-data received from communication device 130C. For example, a PTS user's trustworthiness may be rated based on the degree of correlation of phy-data and/or psy-data the PTS user provided with phy-data and/or psy-data provided by other PTS or Tranzmate-users of the system.

According to some embodiments, based on received phy-data and/or psy-data, Tranzmate system 100 may be operative to provide the Tranzmate-user with PTS information comprising an estimate about future behavior of entities using PTS 199. For example, based on phy-data and/or psy-data received from communication devices 130A-130G in the past (e.g., past seconds(s), minute(s), hour(s) and/or week(s), PTS analyzer 180 may estimate or forecast the future behavior of the PTS users associated with communication devices 130A-130G for the next second(s), minute(s), hour(s) or upcoming week(s).

In some embodiments, based on the estimate about future behavior of PTS users, reduced performance or capacity (hereinafter also referred to as "bottleneck") of PTS 199 may be identified, e.g., by PTS analyzer 180.

For example, responsive to phy-data and/or psy-data, PTS 199 may be analyzed with respect to reduced performance or capacity (hereinafter also referred to as "bottleneck") by PTS analyzer 180. PTS 199 may be analyzed for bottlenecks that occurred in the past, occur substantially in real-time and/or for estimating the likelihood of the occurrence of a bottleneck in the future. In some embodiments, following the identification of bottlenecks, PTS information comprising instructions how to avoid or reduce the likelihood of the bottleneck may be provided, e.g., to PTS operator 170 and/or the Tranzmate-user.

For example, a Tranzmate-user such as an operator of PTS 199 may want to know in advance, whether the number PTS users who will take a bus and/or use stops exceeds the number of seats that will be available for their accommodation. In response to said query, PTS analyzer 180 may determine that the number of available seats that will be available is less than the number of PTS users requiring seating accommodation. Consequently, PTS information indicative of a shortage of available seats on a first bus may then be provided to the operator. The PTS information may for example give instructions to PTS operator 170 to send another bus to the station/stop to relieve the seating shortage and, optionally, provide PTS users waiting at the station with PTS information indicating to them that another, empty bus, is sent to pick them up. Therefore, at least some PTS users waiting at the station may not board the first bus and wait for the other bus to arrive. Alternatively, the first bus may not stop at the station but drive on, whereas the second bus may stop for allowing to be boarded by PTS users still waiting at the station.

In some embodiments, Tranzmate system 100 may additionally interface with infrastructure other than PTS 199. Sensors (hereinafter: "traffic sensors") 195 that are sensitive to vehicular and/or pedestrian traffic activity provide an operator of automated road signals ("hereinafter: traffic management") 190, via communication links 198, data about traffic based on which traffic management 190 governs the automated road signals. Traffic management 190 may comprise, for example, a computer terminal operated by traffic management personnel and/or an automated control system.

In some embodiments, traffic sensors 195 may be complemented, replaced and/or overridden by Tranzmate system 100, which may interface with traffic management 190 and provide traffic management 190 with data about traffic which may otherwise not necessarily be available to traffic management system 190. This may aid traffic management 190 in governing and, optionally, optimize traffic. The optimization of traffic may, for example, relate to the prioritization of people over vehicle throughput, and vice versa, over crossings.

For example, Tranzmate system 100 may aid traffic management 190 in controlling the automated road signals in order to optimize for people throughput over an intersection responsive to different passenger loads approaching the traffic crossroads from respective directions.

Considering for example the following scenario, wherein a crossroad may allow vehicular traffic to travel from South to North and from West to East. The crossroad may be approached by a bus loaded with over a hundred PTS users traveling eastwards, and by thirty cars traveling northwards, wherein each car may be occupied by one person only. Traffic sensors 195 may be operative to provide traffic management 190 with traffic-data indicative of the number of vehicles approaching the crossroads from the various directions. Based on the number of approaching vehicles, traffic management 190 may decide that the road signals should be governed to prioritize the cars through the junction over the bus. However, in some embodiments, Tranzmate system 100 may interface with traffic management 190 and may provide the latter, based on data from their respective communication devices, with data related to the number of people approaching the crossroads. Tranzmate system 100 may for example provide traffic management 190 with data indicating that over a hundred people are traveling eastwards and about thirty people are travelling northwards. If traffic management 190 is set to prioritize traffic according to people throughput, the road signals may be governed by traffic management 190 such to prioritize the bus over the cars through the junction.

Further data that may be taken into consideration for optimization of the operation of automated road signals, besides the number of people and/or number of vehicles may be, for example, the timeliness of PTS vehicles. For example, a delayed PTS vehicle may always be prioritized over private traffic, regardless of the number of people traveling in respective directions.

In some embodiments, phy-data may be indicative of a fare due for a particular trip, which may be determined, for example, according to a "pay-per-use" payment scheme. For example, the fare may be determined according to PTS 199 resources the Tranzmate-user actually consumed. For example, the payment due by the Tranzmate-user may depend on the traveled distance, trip duration, delays, number of stops during the trip and/or time of day (e.g., "rush-hour" and "off-peak" period), passenger load; and/or level of satisfaction of the Tranzmate-user. For example, the distance traveled by the Tranzmate-user and, in accordance thereto the fare due, may be determined by a positioning system associated with the Tranzmate-user.

In some embodiments, a Tranzmate-user that provides a rating indicative of low satisfaction about the trip may be granted by Tranzmate system 100 with a fare discount. A Tranzmate-user's indication regarding satisfaction may in some embodiments be scrutinized for sincerity by comparing the provided rating against phy-data and/or psy-data which may, for example, is crowd-sourced. A fare discount may be provided in correspondence with the outcome of said comparison. For example, only if the Tranzmate-user's rating positively correlates with the crowd-sourced data to a certain extent, the Tranzmate-user may be granted a fare discount. In the pay-per-use scheme, the fare due may be determined and, optionally, displayed to the Tranzmate-user, substantially in real-time, via the Tranzmate-user's communication device.

In some embodiments, Tranzmate system 100 enables navigation in relation to PTS 199 that operates aboveground and/or underground.

Figure 3C:
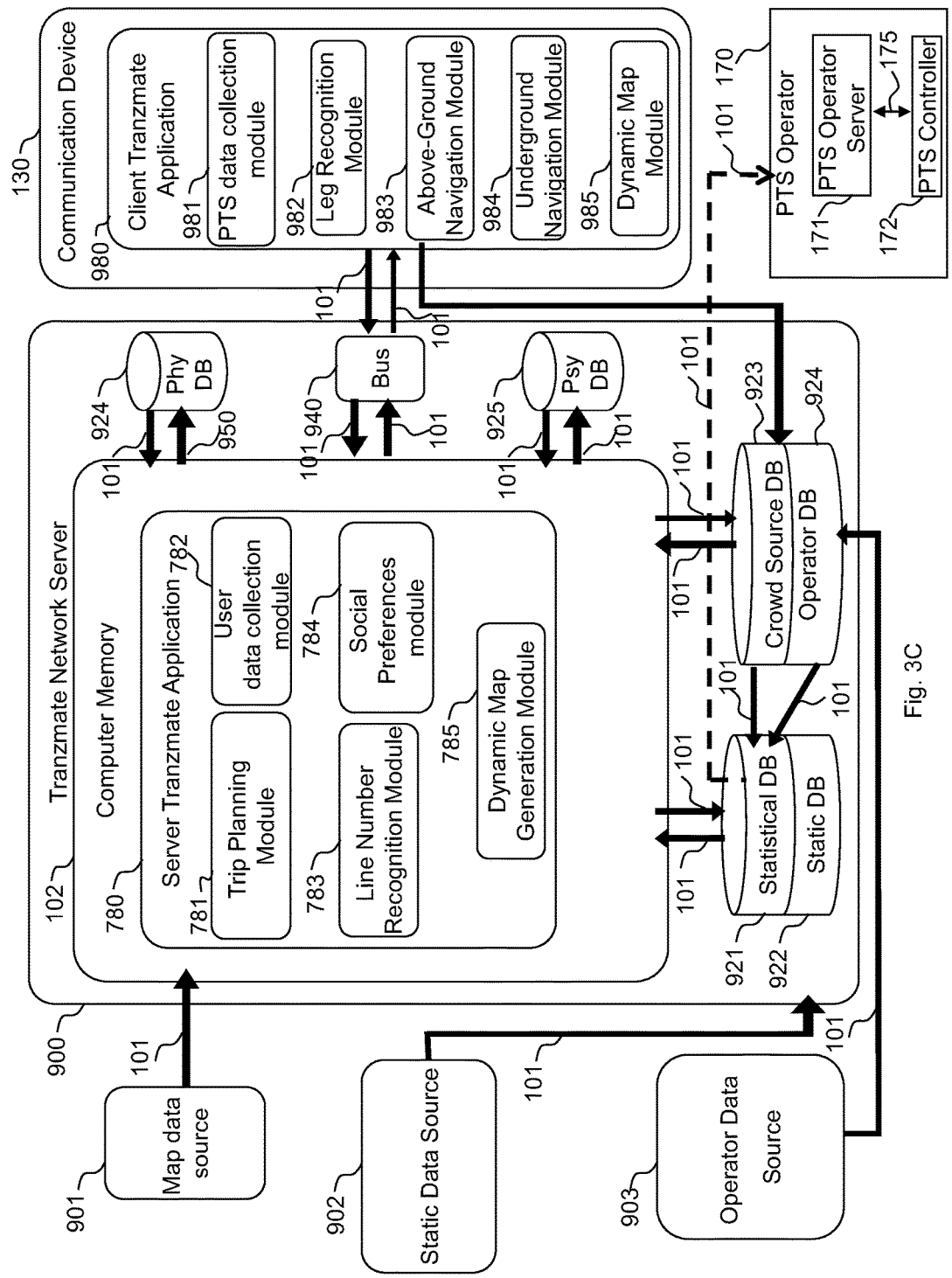
FIG. 3C schematically illustrates another block diagram of the interaction of the Tranzmate system with the PTS, in accordance with some embodiments.

Additional reference is made to FIG. 3C, which schematically illustrates another block diagram of the interaction of Tranzmate System 100 with PTS 199, in accordance with some embodiments.

As exemplified herein below with respect to FIG. 3C, components and/or features of Tranzmate system 100 may be embodied by any suitable software and/or hardware component or components and implemented at different node locations of the communication network. For example, components, features, applications and/or functions of Tranzmate system 100 may be comprised in a Tranzmate network server, a PTS operator server, a PTS controller, in a communication device or devices and/or in onboard computer of PTS vehicles. Correspondingly, part of the processing of phy-data, psy-data and/or preference-data may be performed by a processor of the Tranzmate network server and some by the processor(s) of the communication device(s).

In some embodiments, Tranzmate system 100 may for example include a Tranzmate cloud or Tranzmate network server or servers 900 comprising computer memory 102. Computer memory 102 may receive map data from a map data source 901. In some embodiments, database 109 of Tranzmate network server 900 may include, for example, a statistical database 921 for storing statistical data, a static database 922 for storing static data received from a static data source 902, a crowd source database 923 for storing crowd data received from a communication device 130, and an operator database 924 for storing operator data received from an operator data source 903. Statistical data stored in statistical database 921 may relate to crowd data and/or operator data.

In some embodiments, server Tranzmate application 780 of computer memory 102 may be implemented by various software and/or hardware modules. PTS analyzer 180 may for example include a trip planning module 781 that is operative to provide the Tranzmate-user with trip information determined according to user defined constraints, a user data collection module 782 for acquiring and/or receiving data from communication device 130, a line number recognition module 783 for determining the identity of a PTS vehicle, a social preference module 784 for determining the preferences of the user associated with communication device 130, and a dynamic map generation module 785 for updating, e.g., substantially in real-time, the map data, e.g., responsive to received psy-data.

In some embodiments, Tranzmate network server 900 may include a phy database 924 for storing data descriptive of physically relevant features of PTS 199, and a psy database 925 for storing descriptive of socially relevant features of PTS 199.

In some embodiments, client Tranzmate application 980 may include, for example, a PTS data collection module 981 for acquiring data related to PTS 199, a leg identification module 982 for identifying the stage of the trip made by the Tranzmate-user, an above-ground navigation module 983 for enabling navigation above-ground, an underground navigation module 984 for enabling underground navigation, and a dynamic map module 985 for dynamic updating and displaying of map data.

In some embodiments, communication device 130 and Tranzmate network server 900 may exchange data via a bus 940.

Leg recognition module 982 may be operative to identify, substantially in real-time, the characteristics of current stage of a trip or transit made by the Tranzmate-user such as, for example, the geographic location, direction, activity (e.g., waiting for a bus, getting of at a station), and/or the type of conveyance currently used by the Tranzmate-user (e.g., walking, bus riding, train usage). Tranzmate-system 100 may, in response to the stage identified by leg recognition module 982, provide the Tranzmate-user substantially in real-time with PTS information related to the trip (e.g., remaining time to destination, number of passengers that are currently on board the same PTS vehicle).

Figure 4:
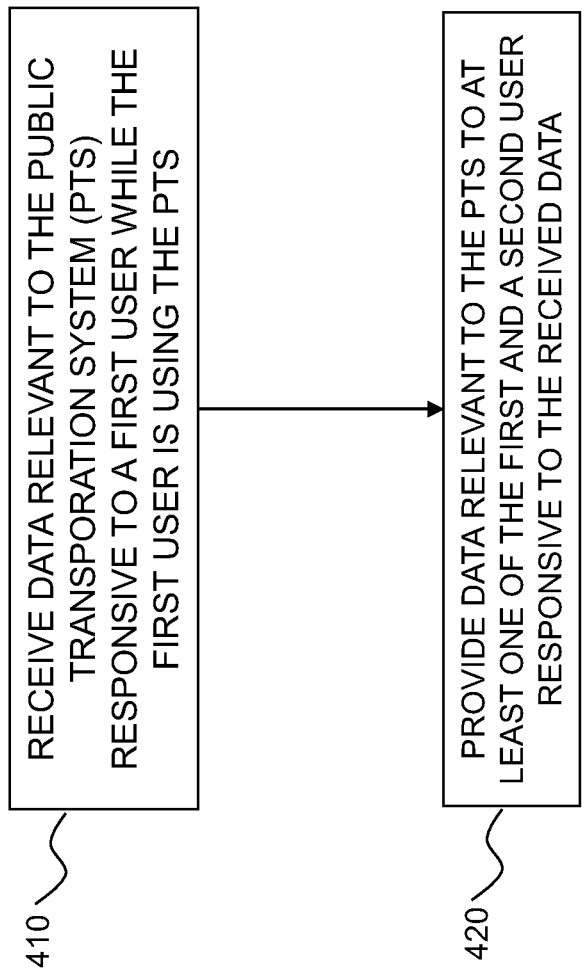
FIG. 4 schematically illustrates a flow-chart of a Tranzmate method for PTS navigation, in accordance with some embodiments.

Further reference is now made to FIG. 4, which schematically illustrates a flow-chart of a Tranzmate method for public transportation navigation, in accordance with some embodiments.

As shown in block 410, the Tranzmate method for PTS navigation may include, for example, receiving data relevant to PTS 199 responsive to a first user while the first user is using PTS 199.

As shown in block 420, the Tranzmate method for PTS navigation may include, for example, providing data relevant to PTS 199 to at least one of the first and a second user responsive to the received data.

In the discussion unless otherwise stated, the term "entity" as used herein may refer to any one of users, clients, software, computers, providers, operators, servers and/or communication networks that are at least sometimes in operative association with PTS 199.

In some embodiments, a travel pattern of PTS vehicles may be determined based on phy-data and/or psy-data provided by the PTS user. Information comprising phy-data indicative about the PTS vehicle such as, for example, position of the associated communication device; vehicle type; vehicle number; name of the route; location, number and name of stations; or distance traveled, may be provided by the PTS user to associate a travel pattern to the PTS vehicle. Phy-data provided by the PTS user may be compared with phy-data administrated by the operator of PTS 199. If the user's phy-data matches the operator's phy-data, the PTS vehicle is identified.

Figure 5:
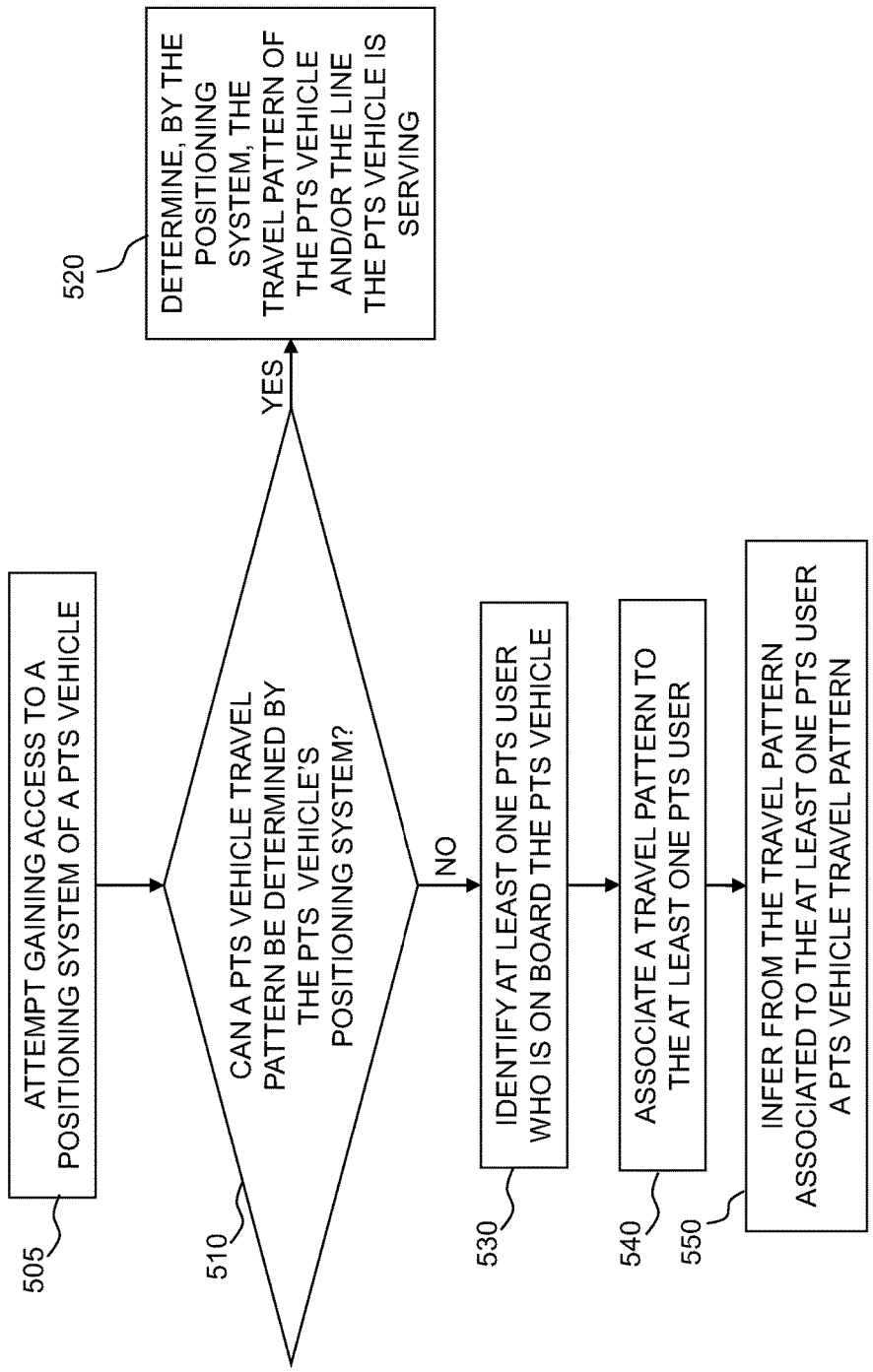
FIG. 5 schematically illustrates a flow chart of a Tranzmate method for identifying a PTS vehicle travel pattern and a PTS line, in accordance with some embodiments.

Reference is now made to FIG. 5, which schematically illustrates a flow chart of a Tranzmate method for identifying a PTS vehicle travel pattern and a PTS line.

As shown in block 505, the Tranzmate method may include, for example, attempting to gain access to a positioning system of a PTS vehicle.

As shown in block 510, the method may include, for example, checking if the travel pattern of the PTS vehicle can be determined by the PTS vehicle's positioning system.

As shown in block 520, if the PTS vehicle's travel pattern can be determined by the PTS vehicle's positioning system, the method may then include, for example, determining, by the positioning system, the travel pattern of the PTS vehicle and/or the line the PTS vehicle is serving. The line the PTS vehicle is serving may be determined by, for example, comparing the travel pattern of the vehicle to a database comprising coordinates of a plurality of PTS lines and determining if the travel pattern of the vehicle overlaps or substantially overlaps coordinates of a PTS line contained within the database.

Otherwise, i.e., if the PTS vehicle's travel pattern cannot be determined by the PTS vehicle's positioning system, the method may then include, as shown in block 530, identifying at least one PTS user who is on board the PTS vehicle.

As shown in block 540, the method may then include, for example, associating a travel pattern to the at least one PTS user who is on board the PTS vehicle.

As shown in block 550, the method may include, for example, inferring from the travel pattern associated to the at least one PTS user, the travel pattern of the PTS vehicle.

The PTS user(s) may, for example, provide phy-data about their location, number of stops, name of stops, and arrival and departure times at stops while being on board the PTS vehicle. The method may further include comparing the phy-data provided by the PTS user with phy-data administrated by the operator of the PTS vehicle. If the PTS user's phy-data matches the operator's phy-data of a PTS vehicle, the identity of the PTS vehicle and its corresponding route or line may be determined.

There is further provided in accordance with an embodiment of the invention, a method for providing information relevant to using a public transportation system (PTS), the method comprising: receiving data relevant to the PTS responsive to a first user while the first user is using the PTS; and providing data relevant to the PTS to at least one of the first and a second user responsive to the received data. Optionally, the data relevant to the PTS responsive to the first user is received from the first user via a first communication device associated with the first user. Optionally, the data relevant to the PTS is provided via the first communication device associated with the first user and a second communication device associated with the second user. Optionally, the data relevant to the PTS is descriptive of at least one of physically relevant features and socially relevant features of the PTS. Optionally, the data descriptive of socially relevant features is descriptive of at least one of the following: gender; age; profession; education; marital status; religious affiliation, indication about why the first user is using a particular route; interest profiles; and about the internet activity of the first user. Optionally, the data descriptive of physically relevant features is descriptive of at least one of the following: the number of stops and stations along the routes, types and conditions of PTS vehicles that travel the routes, timetable schedules; position of PTS vehicles; PTS vehicle load; passenger load; delays, transit condition, line condition, estimate or forecast about passenger and vehicle movement, PTS vehicle travel patterns, and PTS usage patterns respective of PTS users. Optionally, data is at least one of the following data type: operator data, crowd data, statistical data and static data. Optionally, the received data is indicative of the direction or size of a crowd of people. Optionally, receiving data relevant to the PTS responsive to the first user, while the first user is using the PTS, comprises: determining which data type to acquire according to a predetermined selection criterion; and acquiring the data-type relevant to the PTS in accordance with the predetermined selection criterion. Optionally, the method further comprises analyzing the data relevant to the PTS and responsive to the received data such to provide PTS information to at least one of the first and the second users. Optionally, the method comprises comparing the received data responsive to the first user with preference data indicative of user preferences of at least one of the first and second user; determining whether there is a match between the received data and the preference-data of at least one of the first and the second user; and if a match is found, providing PTS information to at least one of the first and second user. Optionally the method further comprises, determining a position of a PTS vehicle used by the first user, based on the received data relevant to the PTS responsive to the first user. Optionally, the preference-data stipulate constraints about at least one of the following: desired trip, quality of transportation, quality of operation, and socially relevant features. Optionally, providing data relevant to the PTS comprises displaying information on a map comprising at least one icon indicative of a PTS vehicle and at a route of travel. Optionally, the map further comprises information indicative of the source of the PTS data. Optionally, providing data relevant to the PTS comprises providing data to a group of PTS users, the identity of the group of PTS users based on security settings set by the first user.

There is further provided in accordance with an embodiment of the invention, a system for providing information relevant to a public transportation system, the system comprising: a communication module for receiving data relevant to the PTS responsive to a first user while the first user is using the PTS; a memory for storing a set of instructions; and a processor for executing the set of instructions for processing the received data; the communication module providing data relevant to the PTS to at least one of the first and a second user responsive to the received data. Optionally, the system comprises at least one program, wherein the at least one program is stored in the memory; the at least one programs including: instructions for acquiring data relevant to the PTS responsive to the first user while the first user is using the PTS; and instructions for providing data relevant to the PTS to at least one of the first and the second user responsive to the acquired data.

There is further provided in accordance with an embodiment of the invention, a computer-program product, comprising: a computer readable storage medium and a computer program mechanism embedded therein, the computer program mechanism comprising instructions, which when executed by a system for providing information relevant to a public transportation system, causes the system to: acquire data relevant to the PTS responsive to a first user while the first user is using the PTS; and provide data relevant to the PTS to at least one of the first and a second user responsive to the acquired data.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments in the present application are provided by way of example and are not intended to limit the scope of the embodiments. The described embodiments comprise different features, not all of which are required in all embodiments. Some embodiments utilize only some of the features or possible combinations of the features. Variations of embodiments that are described, and embodiments comprising different combinations of features noted in the disclosure, will occur to persons of the art. The scope of the embodiments is limited only by the claims.

The invention claimed is:

1. A method for providing information relevant to using a public transportation system (PTS), the PTS comprising a plurality of PTS vehicles, the method comprising:
    receiving, at a server, data relevant to the PTS responsive to a first user of a PTS vehicle actively operating the first user's communication device while the first user is using the PTS vehicle, the received relevant data comprising data descriptive of socially relevant features of users of the PTS vehicle; and
    providing, on a second user's communication device, data responsive to the received relevant data, wherein
    the data descriptive of socially relevant features of users of the PTS vehicle comprises data descriptive of at least one of the following: personal identity; income; consumer preference; gender; age; profession; education; marital status; religious affiliation, and/or indication of interest profiles.

2. The method according to claim 1, wherein the received relevant data is received from the first user's communication device passively.

3. The method according to claim 1, wherein the received relevant data is received from the first user's communication device in real-time.

4. The method according to claim 1, wherein the data descriptive of socially relevant features of users of the PTS vehicle comprises data descriptive of at least one of the following: gender; age; profession; education; marital status; religious affiliation, and/or indication of interest profiles.

5. The method according to claim 1, wherein the received relevant data comprises location and direction of movement of the first user's communication device, and the method further comprises:
    determining, by the server, that the location and direction of movement of the first user's communication device corresponds to location and direction of movement of a PTS vehicle of the plurality of PTS vehicles by comparing the location and direction of movement of the first user's communication device to static PTS vehicle location and direction of movement data; and providing data on a second user's communication device relevant to the location of the PTS vehicle.

6. The method according to claim 1, wherein providing data responsive to the received relevant data comprises displaying information on a dynamic map comprising at least one icon indicative of the PTS vehicle and at a route of travel.

7. The method according to claim 6, wherein the map further comprises information indicative of the source of the received relevant data.

8. The method according to claim 1, wherein providing the received relevant data comprises providing data to a group of PTS users, the identity of the group of PTS users based on security settings set by the first user.

9. A system for providing information relevant to a public transportation system (PTS) comprising a plurality of PTS vehicles, the system comprising:
- a communication module for receiving data relevant to the PTS from a first user of a PTS vehicle via the first user's communication device while the first user is using the PTS vehicle;
- a memory for storing a set of instructions and the received relevant data; and
- a processor operable to execute the set of instructions for analyzing the received relevant data;
- wherein the communication module is operable to transmit to a second user via the second user's communication device data responsive to the received relevant data;
- the received relevant data comprises data descriptive of socially relevant features of users of the PTS vehicle; and
- the memory comprises a database for storing the data descriptive of socially relevant features of users of the PTS vehicle, wherein
- the data descriptive of socially relevant features of users of the PTS vehicle:
  - is provided by the first user actively operating the first user's communication device; and
  - comprises data descriptive of at least one of the following: personal identity; income; consumer preference; gender; age; profession; education; marital status; religious affiliation, and/or indication of interest profiles.

10. The system according to claim 9, wherein the memory stores:
- instructions for acquiring data relevant to the PTS responsive to the first user while the first user is using the PTS; and
- instructions for providing data relevant to the PTS to the second user responsive to the acquired data.

11. The system according to claim 9, wherein:
- the received relevant data comprises a location and direction of movement of a first user's communication device data while the first user is using the PTS vehicle; and
- the processor is operable to analyze the received location and direction of movement of a first user's communication device data to determine if the location and direction of movement of the first user's communication device corresponds to location and direction of movement of a PTS vehicle based on a static PTS vehicle route stored in the memory.

12. The system according to claim 11, wherein the location and direction of movement of a first user's communication device comprises data obtained through at least one of: GPS, Radio-frequency identification (RFID), signal strength measuring techniques and network triangulation techniques.

13. The system according to claim 12, wherein the received relevant data comprises static PTS vehicle location and direction of movement data comprises timetable schedules associated with a PTS.

14. A method for providing information relevant to using a public transportation system (PTS), the PTS comprising a plurality of PTS vehicles, the method comprising:
- receiving at a server data relevant to the PTS responsive to a first user of a PTS vehicle via the first user's communication device while the first user is using the PTS vehicle, the received relevant data comprising location and direction of movement of the first user's communication device, and data descriptive of socially relevant features of users of the PTS vehicle;
- determining, by the server, that the location and direction of movement of the first user's communication device corresponds to location and direction of movement of a PTS vehicle of the plurality of PTS vehicles by comparing the location and direction of movement of the first user's communication device to static PTS vehicle location and direction of movement data; and
- providing data on a second user's communication device relevant to the location of the PTS vehicle and data descriptive of socially relevant features of users of the PTS vehicle responsive to the received data from the first user, via the first user's communication device,
- wherein the data descriptive of socially relevant features of users of the PTS vehicle:
  - is provided by the first user actively operating the first user's communication device; and
  - comprises data descriptive of at least one of the following: personal identity; income; consumer preference; gender; age; profession; education; marital status; religious affiliation, and/or indication of interest profiles.

* * * * *